INVENTOR.
J. LOUIS NIELSEN
BY
Raymond L. Owens
HIS ATTORNEY

Dec. 3, 1968

J. L. NIELSEN 3,414,798

CONSTANT VOLTAGE POWER SUPPLY UTILIZING INDEPENDENT
REFERENCE AND CONTROL CIRCUITS COUPLED TO EACH
OTHER BY AN OPTICAL LINK

Filed Sept. 1, 1966

INVENTOR.
J. LOUIS NIELSEN
BY
Raymond L. Owens
HIS ATTORNEY

United States Patent Office 3,414,798
Patented Dec. 3, 1968

3,414,798
CONSTANT VOLTAGE POWER SUPPLY UTILIZING INDEPENDENT REFERENCE AND CONTROL CIRCUITS COUPLED TO EACH OTHER BY AN OPTICAL LINK
Jorgen Louis Nielsen, Penfield, N.Y., assignor to Anchor Coupling Co., Inc., Libertyville, Ill., a corporation of Illinois
Filed Sept. 1, 1966, Ser. No. 576,623
6 Claims. (Cl. 321—2)

ABSTRACT OF THE DISCLOSURE

A regulated power supply is disclosed including an alternating current switch having silicon controlled rectifiers which are responsive to a control signal and keys a line voltage on and off in accordance with the control signal. The line voltage is applied to rectifier and filter networks to produce direct current output voltages. One of these control voltages is applied to a comparison circuit which includes a light producing element. The light beam produced by this element is variable in accordance with the difference between a reference voltage and the power supply output voltage from the rectifiers and filters. A firing circuit including a unijunction transistor having a light dependent resistor in its timing circuit provided for generating the control signal to the firing circuit. The light dependent resistor is optically coupled to the light producing element by way of the light beam.

Figure 1:
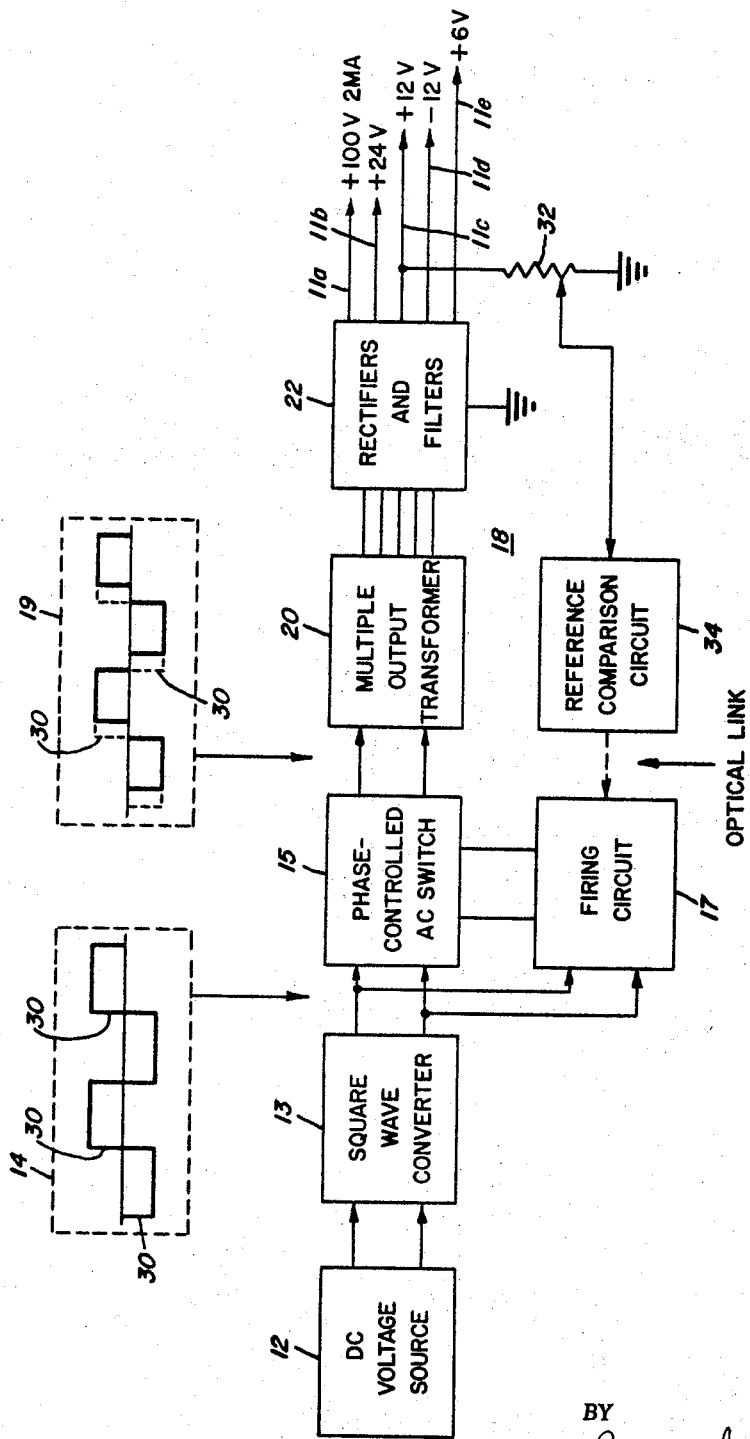

The present invention relates to power supplies, and more particularly, to a power supply adapted to produce a precise DC output voltage irrespective of variations of the line voltage at the input to the power supply.

Various power supply arrangements are currently employed for maintaining a precise output voltage despite fluctuations in the line voltage. One version employs a switching technique for keying on and off the line voltage. The keyed line voltage is applied to rectifying and filtering networks which develop the desired output voltage. In order to provide the proper sequencing or rate of switching, these power supplies usually employ a feedback control loop which samples the output of the power supply and provides the sampled output as an input to a comparison circuit. The comparison circuit compares the sampled output with a reference voltage (e.g. obtained from a Zener diode); develops a control signal; and applies the control signal to operate the switching (viz. to key on and off the line voltage at a rate or for durations which make the output voltage constant).

Because the switching circuit and the power supply output are not referenced at the same DC potential, a magnetic amplifier is usually provided for isolation purposes. For example, the switching circuit may be constrained to operate with a "floating" reference (i.e. the "neutral" point of a 3-wire, 3-phase system), which must not be connected to the reference point (usually chasis ground) for the feedback sample voltage. Although magnetic amplifiers are effective in circumventing this problem, they are disadvantageous inasmuch as they are expensive, power consuming, heavy, bulky, and they must be tailored for each particular application.

In view of the foregoing, it is an object of this invention to provide an improved high efficiency, regulated DC power supply unit which eliminates the need for magnetic amplifiers.

A further object of the invention is to provide an improved power supply which overcomes the problem of mismatched reference potential between the power supply output potential and the switching circuits in variable switching rate regulated power supplies.

A still further object of the invention is to provide an improve power supply which accurately will maintain an output DC voltage at a precise level over wide ranges of of variations in the input voltage signal to the power supply.

Another object of the invention is to provide an improved power supply which will accurately maintain a precise output voltage despite changes in the operating characteristics of elements in the power supply, such as for example might be induced by variations in ambient temperature changes.

Briefly, an exemplary power supply unit in accordance with the present invention includes an AC switch having silicon control rectifiers, which, in response to a control signal, keys on and off an input or line voltage and is applied to rectifying and filtering networks. Most importantly, the power supply includes a feedback control loop having a comparison circuit optically linked to a trigger or firing circuit arranged to produce a control signal. By means of the optical link between the comparison circuit and the firing circuit, the output of the power supply and the firing circuit are isolated from each other. Each can operate independently with respect to the reference potential (viz, ground) and the problem of a floating reference potential which can cause variations in the power supply output voltage are avoided.

Figure 2:
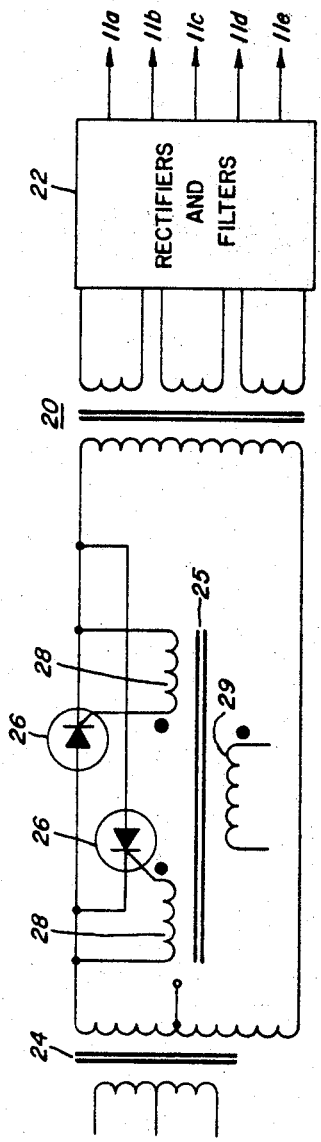
Figure 3:
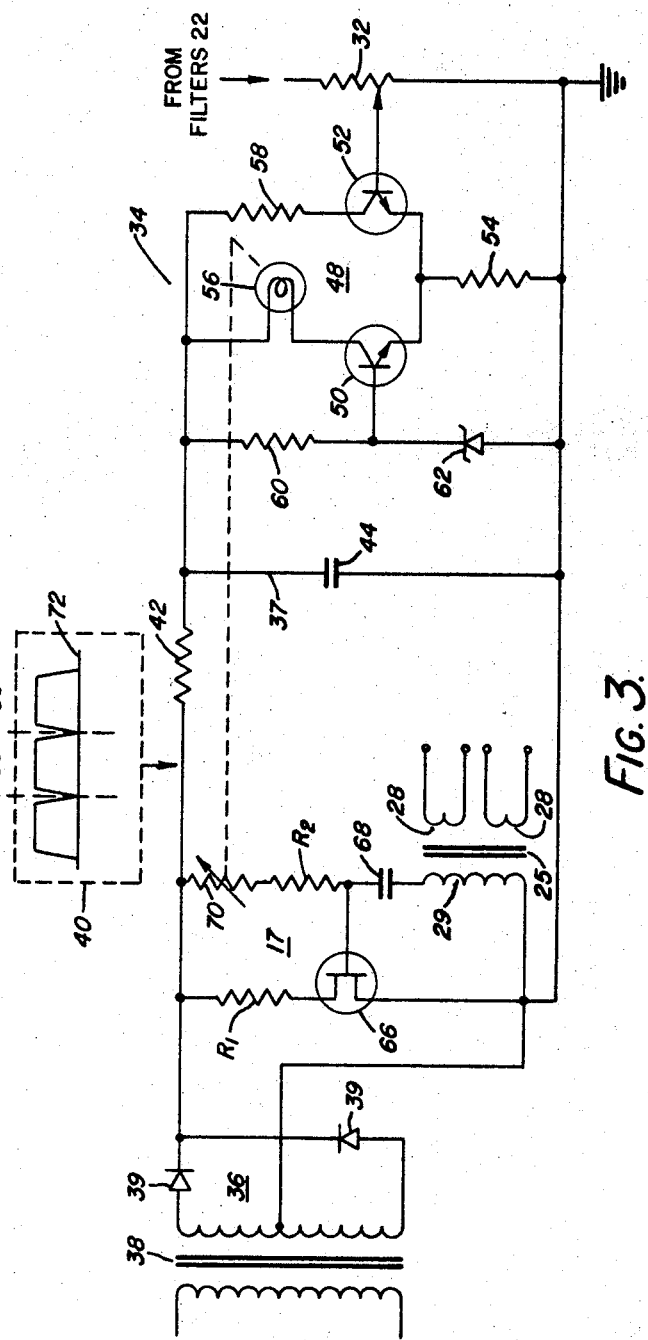

The invention itself, both as to its organization and method of operation, as well as additional objects and advantages thereof, will become more readily apparent from a reading of the following description taken in conjunction with the accompanying drawings in which:

FIG. 1 is a block diagram of an exemplary power supply in accordance with the present invention; and FIGS. 2 and 3 are schematic diagrams of circuits of the power supply shown in FIG. 1.

Turning to FIG. 1, there is shown a power supply 10 which is designed to produce precise output voltages at a plurality of output lead lines 11a–11e in response to a variable input or line voltage obtained from a source 12 which is indicated as a DC source such as a battery. The DC input voltage source 12 is coupled to a square wave converter 13 which produces, as shown, an alternating square wave voltage 14, and provides the square wave 14 as an input to both an AC switch circuit 15 and a firing circuit 17 disposed in a feedback control loop 18.

The role of AC switch 15 in response to a control signal produced by the firing circuit 17 is to modify the waveform of the square 14 and produces a second wave 19 which is applied as an input to a step up transformer 20. This transformer may have a number of secondary windings which produce different output voltages, and is termed a multiple output transformer. The multiple output transformer 20 applies a plurality of output voltage signals to rectifying and filtering networks 22 which produce precise DC output voltages on each of the output lead lines 11.

The circuitry of the switch 15 is shown in greater detail in FIG. 2. The input to the switch circuitry 15 is provided by means of a transformer 24, the primary of which is connected to the connector 13. The switch includes a transformer 25 having primary winding 29 and two secondary windings 28. The switch circuitry 15 also includes two silicon controlled rectifiers (SCR) 26. The gate electrode of the SCR's are connected to the secondary windings 28 (see also FIG. 3). When a control signal is developed by the firing circuit 17, a triggering voltage is delivered by the secondaries 28 to the gate electrodes of the SCR's 26. The SCR's conduct thereby connecting the transformer 24 to the primary of the transformer 20.

Essentially, the desired output signal 19 produced by circuitry 15 is provided by initially applying the control signal, developed by the firing circuit 17, a discrete time interval after the leading edge 30 of each of the square waves of signal 14. The control signal is a positive pulse, which turns on whichever one of the SCR's is forward biased due to wave 14. Once pulsed on, the SCR will remain conducting until wave 14 reverses polarity. Stated in another way, by varying the time position when a modified signal 19 is delivered to the transformers 20, using as a reference the leading edge 30 of each individual square wave of the signal 14, whether it be positive or negative, the outputs of the networks 22 may be maintained at precise predetermined levels irrespective of the amplitude of the variable source 12, since they are time integrals of the rectified signal 19.

As shown in detail in FIG. 3 (see also FIG. 1), the feedback control loop 18 is comprised of four main elements: an adjustable potentiometer 32 connected to the most stable of the output lead lines 11c (i.e. the one feeding the most nearly constant load), a reference comparison circuit 34, the firing circuit 17, and full wave rectifying circuitry 36. By varying the setting of the potentiometer 32, the desired voltages on the lines 11 may be varied, as will become clearer hereinafter.

The rectifying circuitry 36 comprises a transformer 38 which couples the converter 13 to back-to-back diodes 39 to develop a waveform 40. Inasmuch as the waveform 40 produced by the circuitry 36 is conventional, further discussion of the circuitry 36 is deemed not to be needed.

The reference comparison circuit 34 obtains its DC operating voltage from a filter network 37 fed from the circuit 36. The filter 37 includes a resistor 42 which is serially connected to a capacitor 44. A difference amplifier 48 is connected across the capacitor 44 and receives an input from the adjustable potentiometer 32 (viz, from the power supply output voltage).

The amplifier 48 includes two NPN transistors 50 and 52, respectively, each transistor shares a common emitter resistor element 54. The transistor 50 has, however, its collector load provided by a light-producing element 56, whereas the transistor 52 has a conventional collector load resistor element 58. In order to provide an appropriate reference for comparison, a resistor 60 and a Zener diode 62 are serially connected across the capacitor 44 and the base of the transistor 50 is connected between these elements. Accordingly, the base voltage of the transistor 50 is clamped at some desired constant voltage level by means of the Zener diode.

The comparison circuit functions as follows: The output voltage 40 from the full wave rectifying circuitry 36 is filtered by the filter 37 and clamped to a relatively constant DC voltage at the base of transistor 50 by action of the Zener diode 62. If the voltage at the potentiometer 32 tap varies from the voltage across the diode 62, the difference amplifier will provide more or less current to the light producing element 56. The intensity of light produced by the element 56 will depend upon the difference between the reference or Zener diode voltage and the output voltage as reduced by the potentiometer 32. The light intensity will, of course, vary in opposite directions depending upon the sense (polarity) of the difference between the reference and output voltage.

Focusing attention on the firing circuit 17, it too is coupled to the full wave rectifying circuitry 36 and is basically a conventional relaxation oscillator which includes a unijunction transistor 66, a capacitor 68, fixed resistances $R_1$ and $R_2$, a light dependent resistance element 70 which has the characteristic that its resistance varies in accordance with the intensity of light from the light producing element 56 which is incident thereon. The transformer 29 is also included in the circuit 17. Commercially available units embodying the elements 56 and 70 are readily available. One such unit which may be employed with the present invention is marketed under the trademark Photomod and is manufactured by the Claire Corporation located at 8 W. 30th St., New York, N.Y. 10001.

In operation, the relaxation oscillator circuit is reset each time the incoming full wave signal 40 dips to a zero level 72 which corresponds to the leading edge 30 of the signal 14, and fires a discrete time thereafter when the capacitor 70 charges to the firing voltage of the unijunction transistor 66. When the transistor conducts, the capacitor 29 discharges rapidly through the unijunction transistor and the primary of the transformer thereby inducing a control or triggering voltage which fires the SCR's 26. The charging time (viz, time constant) of the circuit including the capacitor depends upon the intensity of the illumination of the element 70 by the lamp 56. Thus, the SCR's will be "on" for different portions of the square wave 14, thereby changing the average value of the voltage which is rectified and filtered and provided at the output of the supply.

Briefly reviewing the operation of the power supply unit, a variable DC voltage source 12 is converted to an alternating square wave signal 14 by means of a converter 13 which applies its output voltage 14 as an input to the AC switch 15 and the rectifying circuit 36 coupled to both the firing circuit 17 and the comparison circuit 34. The reference comparison circuit 34 compares a voltage across the potentiometer 32 against one which is developed across a Zener diode 62 and varies the amount of current produced through the light element 56, disposed in the differential amplifier 48 in response to differences in these signals. This action varies the amount of impedance of the element 70 which in turn alters the timing of the control signal to the switch circuitry 15.

What is claimed is:

1. In a power supply providing a precise DC output voltage from an input voltage, said supply having rectifying and filtering means responsive to an input voltage for providing a DC output voltage and switching means for applying said input voltage to said rectifying and filtering means for variable intervals in response to a control signal, said filtering and rectifying in response to the modified signal being adapted to develop said precise DC voltage signal, the improvement comprising:
    (a) firing circuit means for deriving said control signal including a pulse generating circuit coupled to said switching means and having a light dependent element for controlling the timed interval of said control signal in response to variations in the intensity of a light beam, and
    (b) comparison means comprising means for sampling said output voltage to develop a comparison voltage, means for developing a reference voltage, and optical coupling means including a light producing element adapted to provide said light beam responsive to said reference and comparison voltages for varying the intensity of said light beam.

2. The invention as set forth in claim 1 wherein said input voltage is an alternating square wave provided by a source of variable DC voltage, and a square wave converter connected thereto.

3. The invention as set forth in claim 2 including full wave rectifying circuits interposed between the output of said converter and firing circuit, and wherein said pulse generating means includes a unijunction transistor, said light dependent element, and a charging capacitor coupled to said light dependent element, said capacitor being adapted to discharge through said transistor developing said control signal at a discrete interval of time after the leading edge of each wave of said square wave.

4. The invention as set forth in claim 3 wherein said optical coupling means is a difference amplifier embodying said light producing element.

5. The invention as defined in claim 2 wherein said switching means includes a circuit having a plurality of silicon control rectifiers which in response to said control signal couple said square wave to said rectifying and filtering means.

6. The invention as set forth in claim 5 wherein said comparison signal is developed by a potentiometer, the adjustment of which is adapted to vary said precise DC voltage signal.

References Cited

UNITED STATES PATENTS

| | | | |
|---|---|---|---|
| 3,335,318 | 8/1967 | Yancey | 307—301 |
| 3,371,268 | 2/1968 | Knudsen | 323—21 |
| 3,375,428 | 3/1968 | Mitchell | 321—18 |

JOHN F. COUCH, *Primary Examiner.*

W. H. BEHA, *Assistant Examiner.*

UNITED STATES PATENT OFFICE
CERTIFICATE OF CORRECTION

Patent No. 3,414,798     Dated December 3, 1968

Inventor(s) Jorgen Louis Nielsen

It is certified that error appears in the above-identified patent and that said Letters Patent are hereby corrected as shown below:

Column 1, lines 5 through 7 should read:

--Jorgen Louis Nielsen, Penfield, N. Y., assignor to

General Dynamics Corporation, a Corporation of Delaware--

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents